(12) United States Patent
Vander Kuyl et al.

(10) Patent No.: US 7,380,852 B2
(45) Date of Patent: Jun. 3, 2008

(54) OVERHEAD CONSOLE WITH STORAGE BIN

(75) Inventors: Paul T. Vander Kuyl, Holland, MI (US); Michael J. VanDerKolk, Hudsonville, MI (US)

(73) Assignee: Innotec Corporation, Zeeland, MI (US)

( * ) Notice: Subject to any disclaimer, the term of this patent is extended or adjusted under 35 U.S.C. 154(b) by 0 days.

(21) Appl. No.: 11/353,682

(22) Filed: Feb. 14, 2006

(65) Prior Publication Data

US 2007/0187968 A1   Aug. 16, 2007

(51) Int. Cl.
*B60R 27/00* (2006.01)
(52) U.S. Cl. .................... 296/24.34; 296/37.7
(58) Field of Classification Search ............. 296/24.34, 296/37.7, 37.1
See application file for complete search history.

(56) References Cited

U.S. PATENT DOCUMENTS

| | | | | | |
|---|---|---|---|---|---|
| 2,203,402 | A | * | 6/1940 | Bausch ............................. | 206/6 |
| 2,332,266 | A | * | 10/1943 | Segal .............................. | 206/6 |
| 2,805,766 | A | * | 9/1957 | Nathan ............................ | 206/5 |
| 3,845,799 | A | * | 11/1974 | Mittell ............................ | 206/5 |
| 4,290,522 | A | * | 9/1981 | Takasaki ........................ | 206/5 |
| 4,469,365 | A | * | 9/1984 | Marcus et al. .............. | 296/37.7 |
| 4,867,498 | A | * | 9/1989 | Delphia et al. ............. | 296/37.7 |
| 5,050,922 | A | | 9/1991 | Falcoff | |
| 5,261,582 | A | * | 11/1993 | Mathews et al. ........... | 224/240 |
| 5,267,761 | A | * | 12/1993 | Curtindale et al. ........... | 292/81 |
| 5,303,970 | A | | 4/1994 | Young et al. | |
| 5,312,029 | A | * | 5/1994 | Tuber ........................ | 224/679 |
| 5,460,309 | A | * | 10/1995 | Nehl et al. ................ | 296/37.12 |
| 5,507,461 | A | * | 4/1996 | Ackeret .................... | 248/316.1 |
| 5,669,107 | A | | 9/1997 | Carlsen et al. | |
| 6,003,925 | A | * | 12/1999 | Litke et al. ................ | 296/37.7 |
| 6,062,623 | A | * | 5/2000 | Lemmen .................... | 296/37.7 |
| 6,116,675 | A | * | 9/2000 | Iwasawa .................... | 296/37.7 |
| 6,176,534 | B1 | | 1/2001 | Duncan | |
| 6,216,930 | B1 | * | 4/2001 | Plocher et al. ............. | 296/37.7 |
| 6,234,570 | B1 | * | 5/2001 | Quinno et al. ............. | 296/37.7 |
| 6,267,428 | B1 | | 7/2001 | Baldas et al. | |
| 6,315,436 | B1 | * | 11/2001 | Schenk et al. .............. | 362/488 |
| 6,338,517 | B1 | * | 1/2002 | Canni et al. ............... | 296/37.7 |
| 6,575,528 | B2 | | 6/2003 | Tiesler et al. | |
| 6,619,716 | B1 | | 9/2003 | Sturt | |
| 6,824,185 | B2 | * | 11/2004 | Tiesler et al. .............. | 296/37.8 |
| 6,926,333 | B2 | | 8/2005 | Sturt | |
| 6,957,839 | B1 | | 10/2005 | Tiesler et al. | |
| 7,032,945 | B1 | * | 4/2006 | Tiesler .................... | 296/24.34 |
| 7,055,883 | B2 | * | 6/2006 | Tokutomi et al. .......... | 296/37.7 |
| 2005/0093321 | A1 | | 5/2005 | MacWilliams et al. | |
| 2005/0134067 | A1 | | 6/2005 | Brettfeld et al. | |
| 2005/0134073 | A1 | | 6/2005 | Tokutomi et al. | |
| 2006/0097535 | A1 | * | 5/2006 | Nishimura ................. | 296/37.7 |

* cited by examiner

*Primary Examiner*—Kiran B. Patel
(74) *Attorney, Agent, or Firm*—Price, Heneveld, Cooper, DeWitt & Litton, LLP

(57) ABSTRACT

An overhead console for motor vehicles and the like includes a storage bin configured to support and store sunglasses. The bin is movably mounted to the base for movement between an opened position and a closed position. The storage bin includes a body made of a substantially rigid polymer material forming a cavity for storing sunglasses. An elastomeric material is molded to the body of the storage bin, and provides a soft surface on the inner side of the body to support sunglasses. The polymer material of the body forms walls having one or more apertures therethrough, and the elastomeric material extends through the apertures to mechanically connect the elastomeric material to the body of the storage bin.

17 Claims, 6 Drawing Sheets

OVERHEAD CONSOLE WITH STORAGE BIN

BACKGROUND OF THE INVENTION

Various overhead consoles for motor vehicles have been developed. Overhead consoles are typically positioned on the lower side of the-roof of a vehicle where it is readily accessible to a vehicle operator and/or passenger. In addition to lights, displays, and the like, overhead bins may include various storage features.

Storage bins for sunglasses are one type of storage feature. Existing storage bins for sunglasses may be pivotably mounted to the overhead console for movement between open and closed positions for insertion and removal of the sunglasses. One known type of storage bin construction includes a molded plastic shell forming a cavity for the sunglasses. One or more pieces of foam are glued to the inside surface of the shell to cushion sunglasses positioned in the storage bin.

During fabrication of such storage bins, the shell is molded and then moved to another manufacturing facility or area within the manufacturing facility. Foam pieces are cut to size, and adhesive is applied to the shell and/or the foam pieces. The foam pieces are then positioned in the shell and the adhesive is allowed to set. This fabrication process typically includes numerous operations to cut the foam pieces to size, apply the adhesive, and position the foam pieces in the shell. A substantial number of these operations may be done in a time-consuming, manual manner. Also, proper sizing, positioning, and adhesive bonding of the foam pieces creates quality control issues and may lead to scrapped parts, production delays and the like.

Accordingly, a storage bin construction alleviating the above-identified disadvantages of known storage bins would be beneficial.

SUMMARY OF THE INVENTION

One aspect of the present invention is an overhead console for motor vehicles. The overhead console includes a base having a first portion adapted to be connected to the inside of a roof of a motor vehicle. The base also includes a second portion having a bin-engaging structure. The overhead console further includes a storage bin for sunglasses that is movably connected to the bin-engaging structure. The bin is movable between open and closed positions relative to the base. The bin includes a body made of a substantially rigid polymer material defining a cavity adapted to receive and hold a pair of sunglasses. The body includes an opening to the cavity having a size and shape permitting insertion and removal of a pair of sunglasses therethrough into and out of the cavity. The storage bin includes elastomeric material attached to the body. At least a portion of the elastomeric material is positioned facing the cavity to support a pair of sunglasses in the cavity.

Another aspect of the present invention is a storage bin for overhead consoles of motor vehicles. The storage bin includes a shell-like structure made of a substantially rigid polymer material. The shell-like structure defines a first portion, a rear portion, an upper portion, a lower portion and opposite end portions. The shell-like structure further defines an inner surface and an outer surface. The shell-like structure includes a main sidewall defining inner and outer surfaces, and a secondary sidewall extending upwardly from the main sidewall at the rear portion of the shell-like structure. The secondary sidewall defines inner and outer surfaces. The shell-like structure further includes a lip extending upwardly from the main sidewall at the rear portion of the shell-like structure. The lip defines inner and outer surfaces. The shell-like structure also includes first and second end walls, inner and outer surfaces and extending upwardly from the main sidewall at the opposite end portions of the shell-like structure. The inner surfaces of the end walls are spaced apart at least about four inches to accommodate a folded pair of adult sunglasses therebetween. The storage bin further includes a cushion made of a material that is substantially softer than the polymer material of the shell-like structure. The cushion is positioned on at least a portion of the inner surfaces of the main sidewall, the secondary sidewall, the lip, and the first and second end walls to thereby provide a cushioned support surface for sunglasses positioned in the storage bin. The shell-like structure has at least one aperture therethrough, and a portion of the cushion extends through the aperture and retains the cushion to the shell-like structure.

These and other features, advantages, and objects of the present invention will be further understood and appreciated by those skilled in the art by reference to the following specification, claims, and appended drawings.

BRIEF DESCRIPTION OF THE DRAWINGS

FIG. 2;

FIG. 6;

DETAILED DESCRIPTION OF PREFERRED EMBODIMENT

Figure 1:
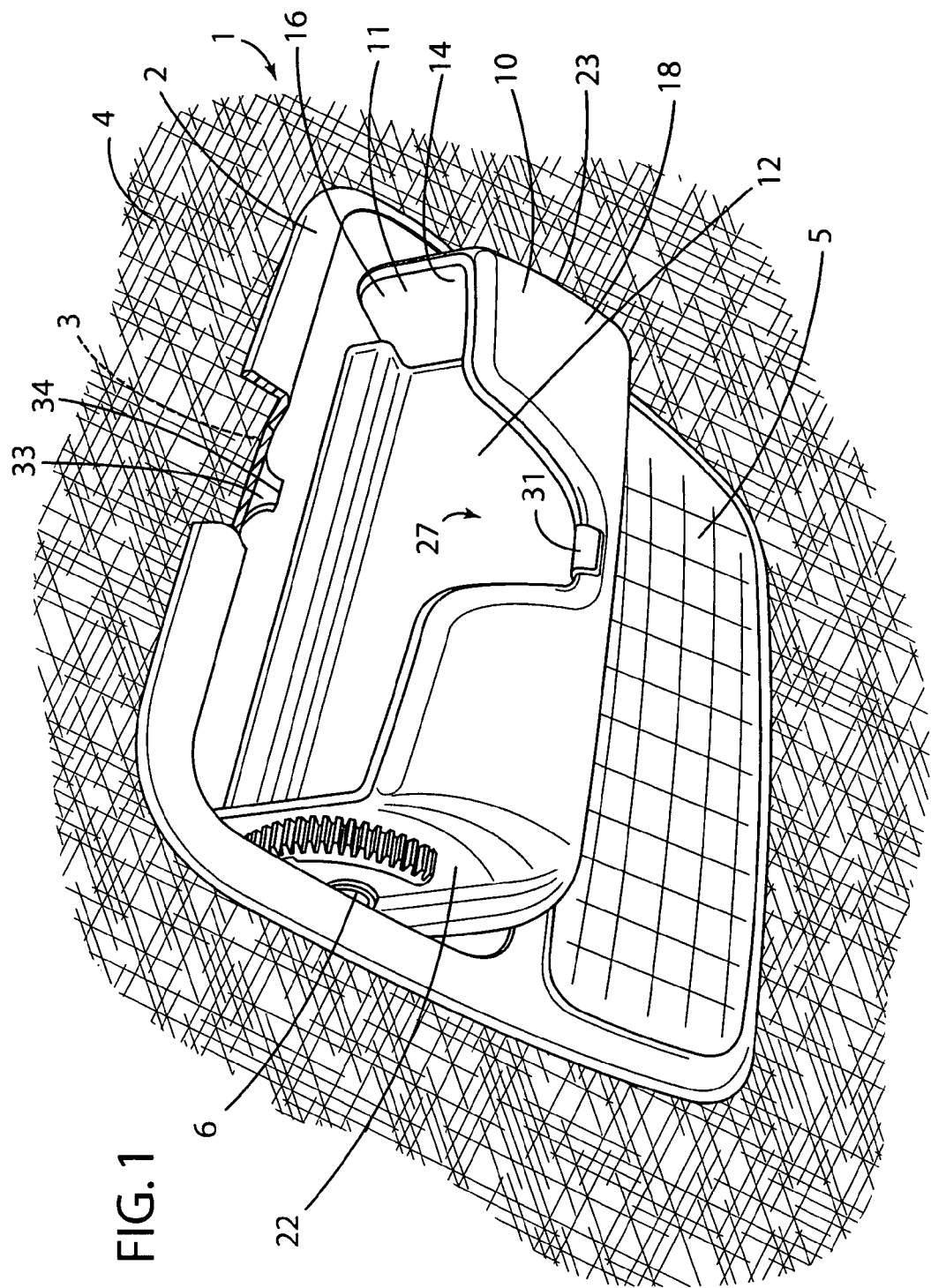
FIG. 1 is a perspective view of an overhead console and storage bin according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an overhead console 1 includes a base 2 having an upper side portion 3 that attaches to a vehicle roof 4. The overhead console may include a light 5 and/or additional items such as a compass, a display showing the ambient temperature, or other such features. In the illustrated example, the base 2 has a molded plastic construction, but other materials and construction techniques may also be utilized.

A storage bin 10 is pivotably mounted to the base 2 via bosses 6 for movement between an open position shown in FIG. 1, and a closed position (not shown) wherein surface 15 is generally horizontal to provide an uncluttered appearance. When the storage bin 10 is in the open position, an opening 11 permits insertion and positioning of a pair of sunglasses (not shown) in a cavity 12 of storage bin 10, and also permits removal of sunglasses.

Figure 2:
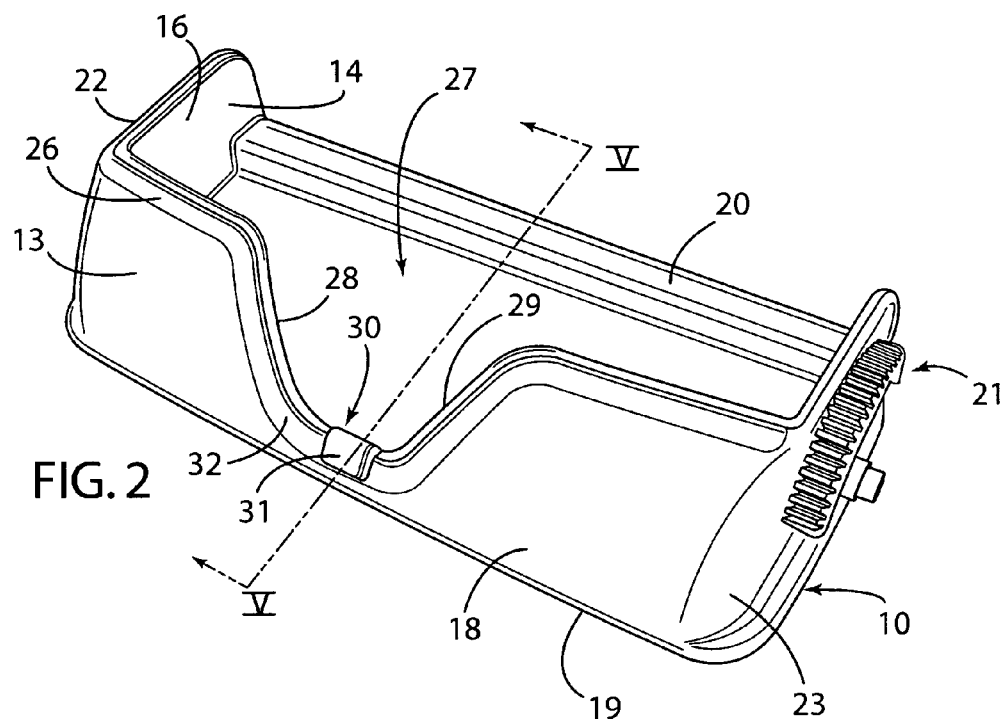
FIG. 2 is a perspective view of the storage bin of FIG. 1 showing the inside of the storage bin.
Figure 3:
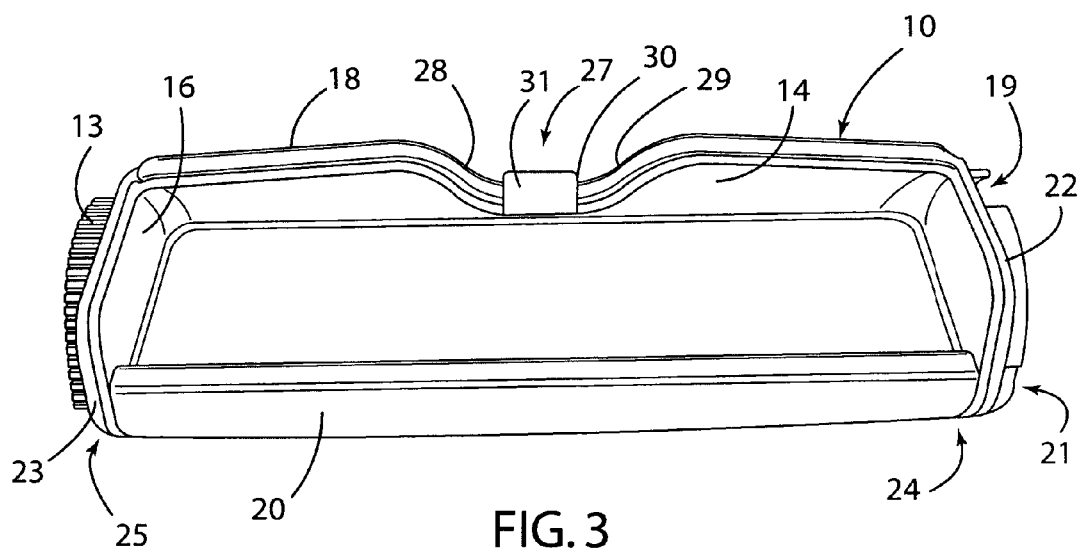
FIG. 3 is a perspective view of the storage bin of FIG. 1 showing the inside of the storage bin.
Figure 4:
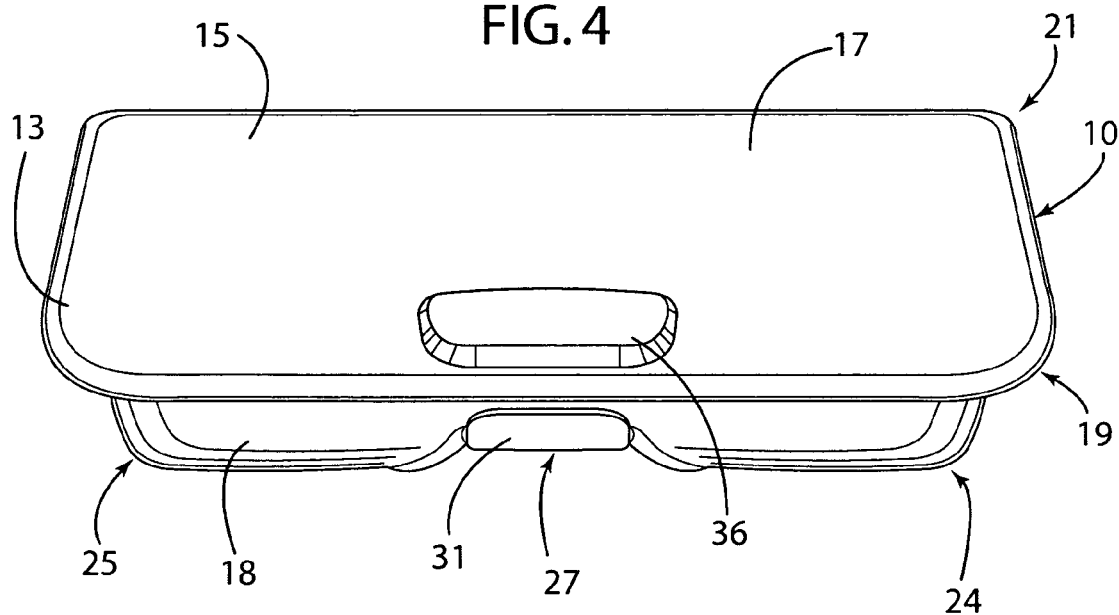
FIG. 4 is a perspective view of the storage bin of FIG. 1 showing the lower side of the storage bin.

With further reference to FIGS. 2-4, storage bin 10 includes a body 13 made of a polymer material that is relatively rigid, and a layer of elastomeric material 14 such as a thermoplastic elastomer covering at least a portion of the inside 16 of body 13 to provide one or more soft support surfaces for sunglasses positioned in storage bin 10. Body 13 includes a primary sidewall 17 (see also FIG. 5) that extends horizontally when storage bin 10 is in the closed position to form a portion of the lower side face of storage bin 10. A curved secondary sidewall 18 extends from a first side portion 19 of body 13, and a lip 20 extends from a second side portion 21 of body 13. first and second end walls 22 and 23, respectively, extend from opposite end portions 24 and 25 of body 13 and extend between primary sidewall 17 and secondary sidewall 18. The distance between tile inner side surfaces of first and second end walls 22 and 23, respectively, is large enough to accommodate a typical pair of adult sunglasses, In the illustrated example, the distance is preferably at least about four inches, and more preferably at least about five inches or at least about six inches. The body 13 is preferably a one-piece structure molded from a polymer material, with sidewalls primary sidewall 17, secondary sidewall 18, first side portion 19, lip 20 and first and second end walls 22, 23, respectively, being integrally formed. Secondary sidewall 18 includes a peripheral edge 26 having a notched V-shaped center portion 27 with edges 28 and 29 (FIG. 2) and a root or base portion 30. The notch 27 provides access to the center portion of a pair of sunglasses positioned in the cavity 12 of storage bin 10 to facilitate insertion and removal of sunglasses. The notch 27 also provides an area for a user to grip when opening the storage bin 10. A flap-like portion 31 of the elastomeric material wraps around the root 30 of the notch 27 and contacts the outer surface 32 of secondary sidewall 18. The flap-like portion 31 of elastomerie material 14 provides a "soft touch" tactile feel for a user. Furthermore, with reference back to FIG. 1, base 2 may include an extension member 33 extending towards the root 30 and flap-like portion 31 of storage bin 1.0. When the storage bin 10 is in the closed position, the end 34 of extension 33 contacts the portion 31 of elastomeric material 14 and thereby provides a biasing feature or function that substantially reduces or prevents movement of bin 10 when in the closed position to prevent rattles and the like. As discussed in more detail below, a heart and pawl mechanism 9 (FIG. 9) controls motion of the storage bin 10 relative to the base 2, and retains storage bin 10 in the closed position.

Figure 5:
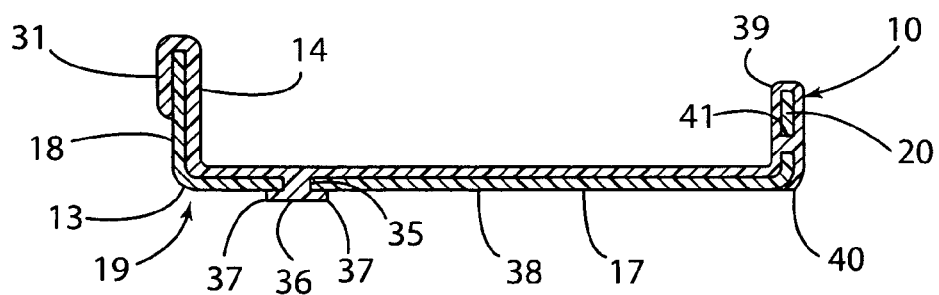
FIG. 5 is a cross-sectional view of the storage bin taken along the line V-V.

With further reference to FIGS. 4 and 5, an aperture 35 extends through primary sidewall 17 of body 13. The aperture 35 is an oblong shape, and the elastomeric material 14 extends through aperture 35 and forms an outer raised pad 36. The edge portions 37 of raised pad 36 extend over the outer surface 38 of primary sidewall 17, and thereby mechanically holds the elastomeric material 14 to the body 13. The raised pad 36 forms a "soft touch" interface feature that provides a soft tactile feel to the user. In use, a user can push on the pad 36 when the storage bin 10 is in the closed position to release the heart and pawl mechanism 9 and thereby open the storage bin 10. Similarly, a user can push on the raised pad 36 when the storage bin 10 is in the open position to move the storage bin 10 into the closed position and thereby latch the heart and pawl mechanism 9 to retain the storage bin 10 in the closed position.

With reference to FIG. 5, a portion 39 of the elastomeric material 14 wraps around lip 20, and forms an edge portion 40 at surface 38 of primary sidewall 17. A plurality of apertures 41 extend through the lip 20, and the elastomeric material 14 extends through the aperture to mechanically retain the elastomeric material 14 to the body 13.

Figure 6:
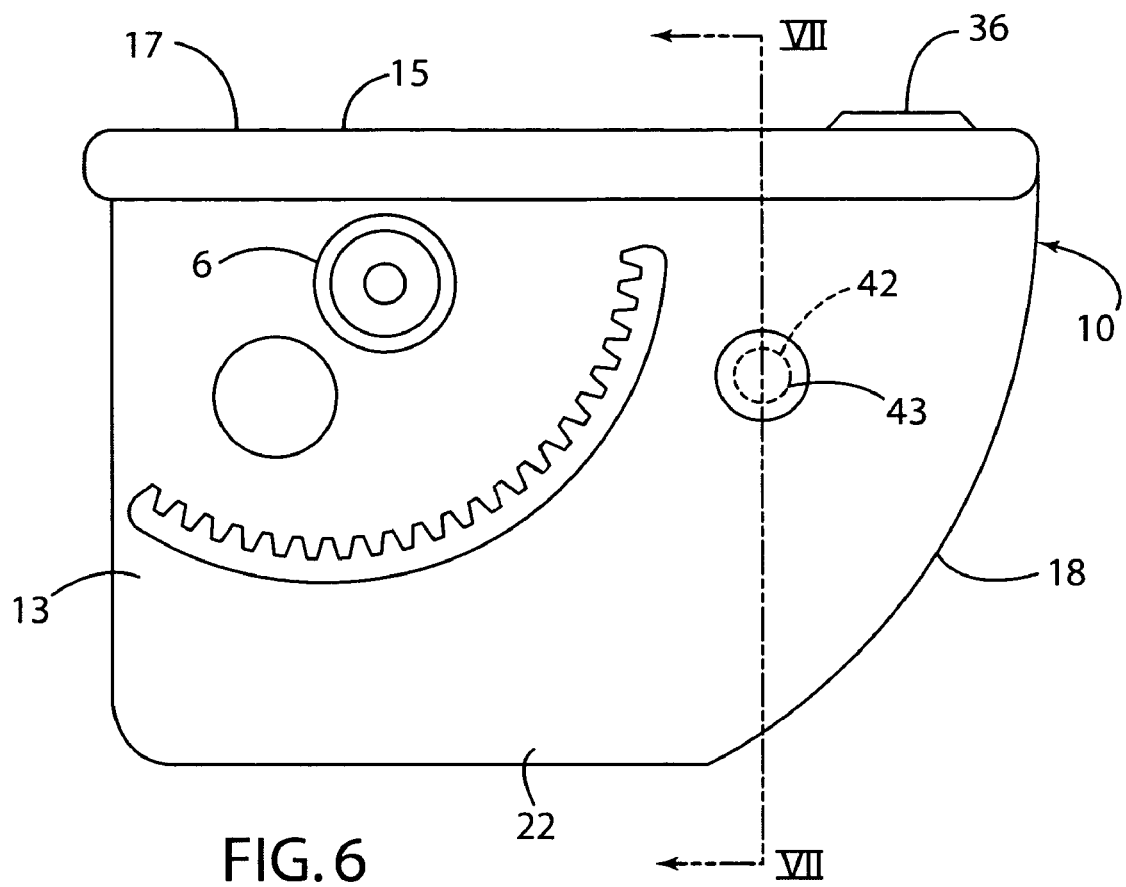
FIG. 6 is an end view of the storage bin of FIG. 1.
Figure 7:
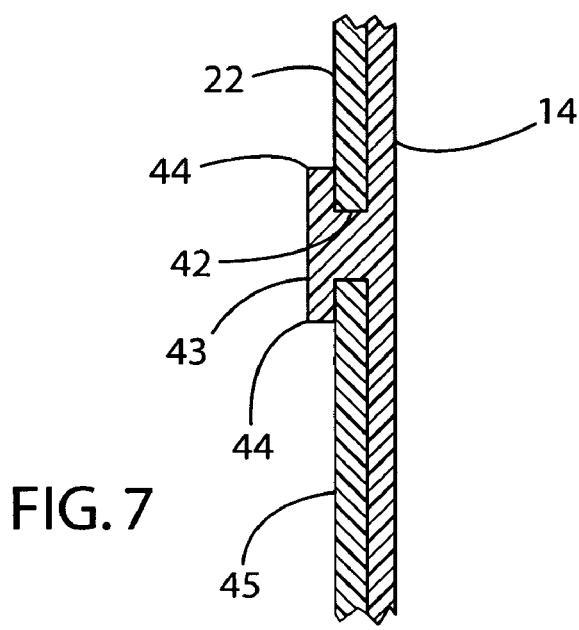
FIG. 7 is a fragmentary, cross-sectional view of a portion of the storage bin taken along the line VII-VII.
Figure 8:
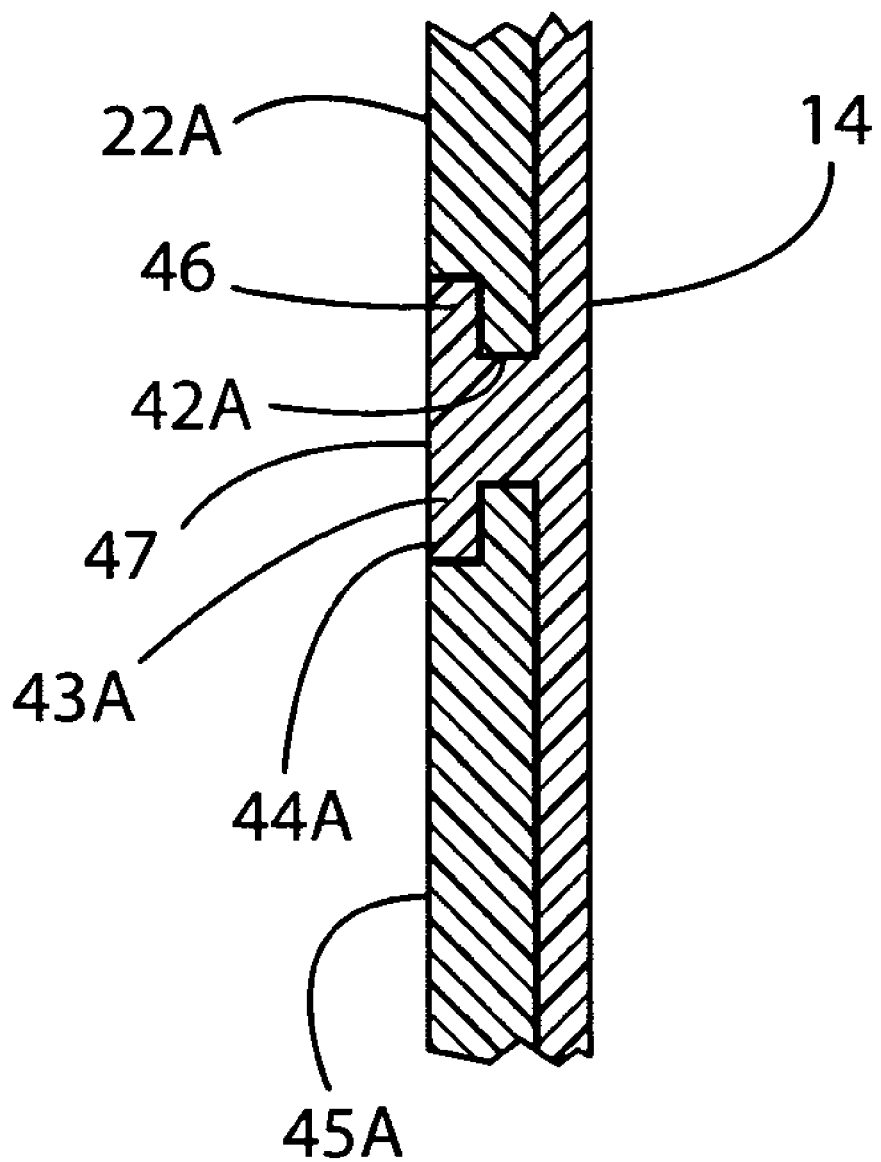
FIG. 8 is a cross-sectional view of a portion of the storage bin according to another aspect of the present invention.

With further reference to FIGS. 6 and 7, first end wall 22 may include an aperture 42, and a portion of the elastomeric material 14 extends through the aperture 42. The outer portion 43 includes peripheral edge portions 44 that contact the outer surface 45 of first end wall 22 to thereby mechanically hold the elastonieric material 14 to the body 13. The aperture 42 and outer portion 43 of elastomeric material 14 are shown as being circular. However, the aperture 42 and outer portion 43 of the elastomeric material 14 may have a variety of shapes and configurations. For example, with reference to FIG. 8 an alternative arrangement includes a sidewall 22A having an aperture 42A having a portion 46 having a larger diameter. The outer portion 43A of elastomeric material 14 includes outer edge portions 44A that are received in the outer portion 46 of aperture 42A. An outer surface 47 of the elastomeric material 14 is flush with the outer surface 45A of sidewall 22A to thereby provide a smooth outer surface that is free of protrusions and the like. Although aperture 42A preferably has a circular cross-sectional shape, numerous other shapes and configurations are also possible.

Figure 9:
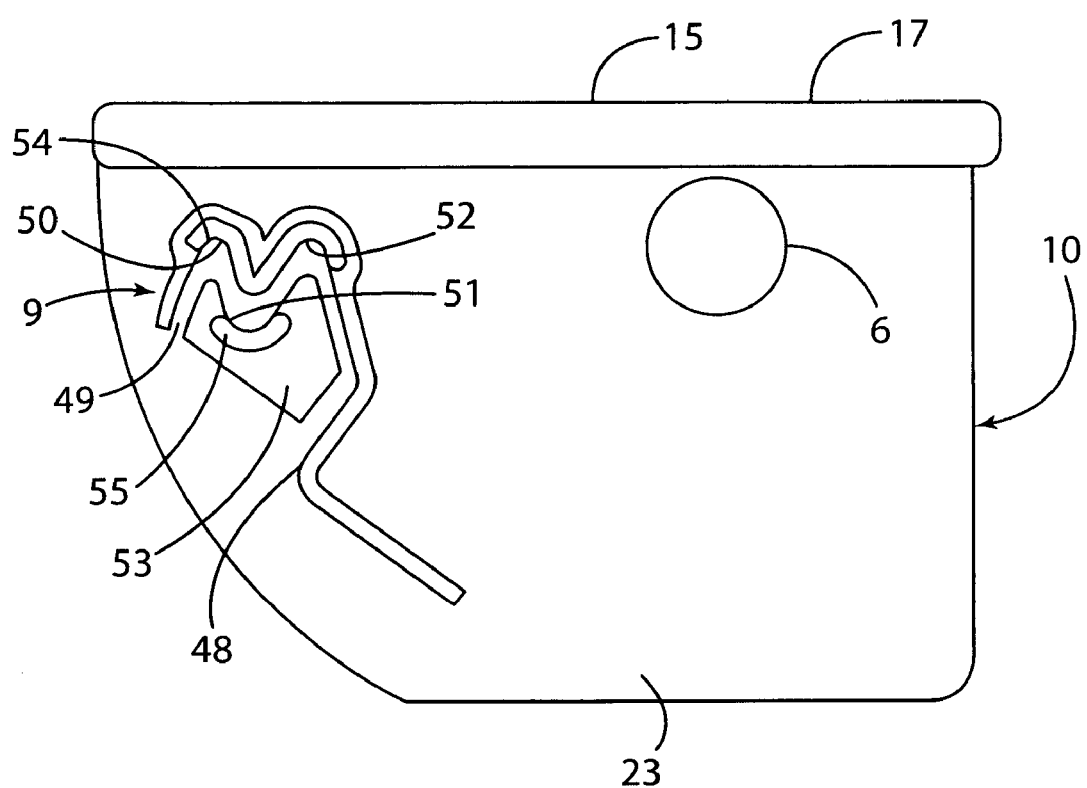
FIG. 9 is an end view of the storage bin showing part of a heart and pawl mechanism that controls motion of the storage bin relative to the base of the overhead console.

With further reference to FIG. 9, heart and pawl mechanism 9 includes a raised sidewall 48 and a raised center portion 53 that define a groove 49 having a first V-shaped portion 50, a second V-shaped portion 51, and a third V-shaped portion 52. The raised sidewall 48 and raised center portion 53 are made of a polymer material that is integrally formed with the body 13. A first elastomeric wall section 54 extends along the raised sidewall 48 at the V-shaped portions 50 and 52, and a second sidewall portion 55 of elastomeric material is positioned in or adjacent the raised center portion 53 to form a sidewall at the second V-shaped groove 51. In use, a pawl (not shown) travels through the groove 49, and controls movement of the storage bin 10 relative to the base 2. The elastomeric material at the corners of the V-shaped portions 50, 51 and 52 provide a cushion for the pawl and thereby reduce the noise and/or vibration that would otherwise result from the pawl contacting the hard plastic material of the sidewall 48. One or more apertures (not shown) extend through the second end wall 23 and interconnect the elastomeric portions 54 and 55 with the elastomeric material 14 on the inside of the storage bin 10 to thereby mechanically hold the elastomerie portions 54 and 55 to the body 13.

During fabrication, the body 13 is molded of a relatively rigid polymer material. The body 13 is then positioned in a second mold having a cavity or cavities that is larger than body 13 at selected locations to form inner layer of elastomeric material 14 and flap-like portion 31, raised pad 36 and other features formed of the elastomeric material 14. The elastomeric material 14 is injected into the cavities to mold the elastomeric material 14 to the body 13. The elastomeric material has a melting temperature that is somewhat less than the polymer material of the body 13 to prevent melting of the body 13 during the molding of the elastomeric material 14. Because the elastomeric material 14 is molded to the body 13, the numerous steps associated with other arrangements wherein the foam is cut to size, adhesive is applied, and the foam was positioned in the bin are eliminated. In this way, storage bin 10 of the present invention reduces the number of operations necessary to fabricate the bin, and also provides for substantially improved quality control. Furthermore, the raised pad provides a "soft touch" tactile feel, and the flap-like portion 31 of the elastomeric material at the V-shaped notch 27 provides a biasing feature to snuggly hold the storage bin 10 in the closed position to thereby alleviate rattles and the like. Still further, the elastomeric material may be utilized to cover substantially the entire surface of the cavity 12, thereby providing additional protection against damage to sunglasses stored in the storage bin 10.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An overhead console for motor vehicles, comprising:
a base;
a storage bin for sunglasses movably connected to the base, the storage bin including a body made of substantially a rigid polymer material;
the storage bin includes elastomeric material that is mechanically attached to the body;
the body has a primary sidewall and a secondary sidewall extending tranversely from the primary sidewall and defining a peripheral edge away from the primary sidewall, and end walls at opposite ends of the body extending between and interconnecting the primary sidewall and the secondary sidewall and including;
at least one aperature through the body; and wherein:
a portion of the elastomeric material extends through the aperature and secures the elastomeric material to the body.

2. The overhead console of claim 1, wherein:
the end walls each have at least one aperture therethrough;
portions of the elastomeric material extend through the apertures.

3. The overhead console of claim 1, including:
an aperture through the primary sidewall and wherein:
a portion of the elastomeric material is positioned in the aperture.

4. The overhead console of claim 3, wherein:
the primary sidewall defines an outer side;
a portion of the elastomeric material extends through the aperture through the primary sidewall and forms a raised area on the outer side of the primary sidewall.

5. The overhead console of claim 4, wherein:
the outer side of the primary sidewall comprises an outer surface;
a portion of the elastomeric material contacts the outer surface adjacent the aperture through the primary sidewall.

6. The overhead console of claim 5, wherein:
the raised area has an oblong shape.

7. The overhead console of claim 5, wherein:
the raised area has an outer surface that is generally parallel to the outer surface of the primary sidewall.

8. The overhead console of claim 1, wherein:
the elastomeric material comprises a thermoplastic elastomer.

9. The overhead console of claim 1, wherein:
the bin is pivotably connected to the base.

10. The overhead console of claim 1, wherein:
the distal peripheral edge of the secondary sidewall has a V-shaped portion;
a portion of the elastomeric material is positioned in the V-shaped portion.

11. The overhead console of claim 10, wherein:
the secondary sidewall defines an inner surface and an outer surface;
the elastomeric material contacts the inner surface and the outer surface adjacent the V-shaped portion of the distal peripheral edge of the secondary sidewall.

12. The overhead console of claim 11, wherein:
the center of the V-shaped portion defines a root portion;
the elastomeric material wraps around the root portion.

13. The overhead console of claim 1, wherein:
the bin defines a sidewall having an inner surface and an outer surface with an aperture extending through the sidewall, and including:
a heart and pawl mechanism controlling movement of the storage bin relative to the base, and including a pawl on the base and a groove in the outer surface of the bin that is generally heart-shaped with at least one V-shaped portion receiving the pawl; and wherein:
a portion of the elastomeric material extends through the aperture and forms a surface of the groove at the V-shaped portion of the groove such that the pawl contacts the elastomeric material.

14. The overhead console of claim 1, wherein:
the body includes a lip extending transversely from the primary sidewall, the lip defining opposite side surfaces and a distal edge;
a portion of the elastomeric material extends around the lip, distal edge and covers portions of the opposite side surfaces, the elastomeric material defining an inner surface facing the secondary sidewall.

15. The overhead console of claim 1, wherein:
a portion of the elastomeric material contacts the base when the bin is in the closed position.

16. The overhead console of claim 15, wherein:
the storage bin includes a sidewall having a V-shaped edge defining a bottom portion at the center thereof;
a portion of the elastomeric material is disposed at the bottom portion; and wherein:
the base includes a stop structure that contacts the elastomeric material disposed at the bottom portion when the storage bin is in the closed position.

17. The overhead console of claim 1, wherein:
the elastomeric material has a first melting temperature;
the polymer material has a second melting temperature; and wherein:
the first melting temperature is significantly lower than the second melting temperature.

* * * * *